Sept. 3, 1935.  C. B. GRADY  2,013,270

GAS TREATING APPARATUS

Filed Jan. 18, 1933  2 Sheets-Sheet 1

INVENTOR:
Charles B. Grady
BY
Morrison, Kennedy & Campbell
ATTORNEYS.

Sept. 3, 1935.  C. B. GRADY  2,013,270
GAS TREATING APPARATUS
Filed Jan. 18, 1933   2 Sheets-Sheet 2

INVENTOR:
Charles B. Grady
BY
Morrison, Kennedy & Campbell
ATTORNEYS.

Patented Sept. 3, 1935

2,013,270

UNITED STATES PATENT OFFICE 2,013,270

GAS TREATING APPARATUS

Charles B. Grady, West Orange, N. J.

Application January 18, 1933, Serial No. 652,251

13 Claims. (Cl. 261—92)

This invention is a novel gas treating apparatus, typically represented by the conditioning of air or other gases by water or other liquids, and adapted for various fields of use, such as household or industrial use.

The invention deals with the treatment of any gas by any liquid, and may be considered in its reverse aspect since, in some cases, a change in the liquid may occur such as enriching it by materials removed from the gases. The general object of the invention is to provide a gas treating apparatus of substantial efficiency and convenience of operation and control. A further object is to provide such an apparatus which will be simple and inexpensive of construction, and reliable in use; and which will be easy to clean and have large water storage.

The utility of the invention may relate to the cleaning of gases, for example by removing dust or other solids or soluble gases or fumes from air or from furnace gases or the like. The invention is also useful for otherwise treating gases, e. g. humidifying or dehumidifying, as for ventilation in dwellings, in which case the treatment of air is by water. The improvement may also be used for the cooling of air or gases, or by suitable provision for heating the liquid, it may be used for the warming of gases, for example for warming air in dwellings in the cold season, under thermostat control. By providing a suitable agent the apparatus may also be used for distributing medication, in the form of vapor, for example by feeding pine needle oil to the liquid by which the gas or air is treated.

Other and further objects and advantages of the invention will be explained in the hereinafter following description of an illustrative embodiment thereof or will be understood to those conversant with the subject. To the attainment of such objects and advantages the invention consists in the novel gas treating apparatus and the novel features of combination, arrangement and construction herein illustrated or described.

In the accompanying drawings Figure 1 may be described as a longitudinal section of an apparatus embodying the present invention.

Figure 1:
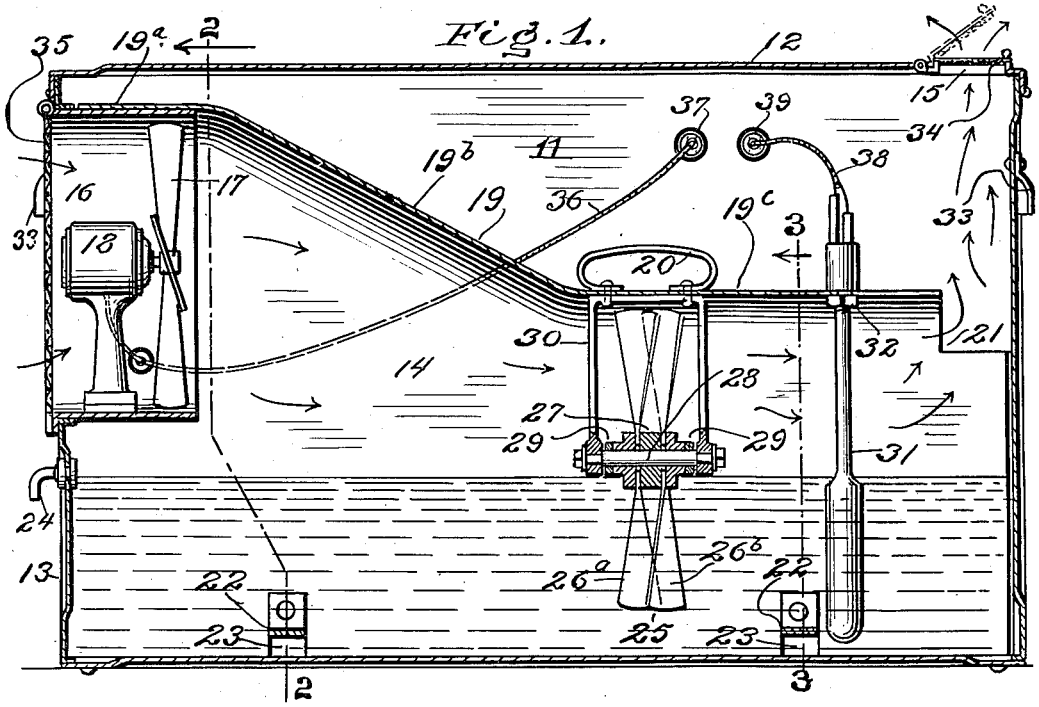
Figure 2:
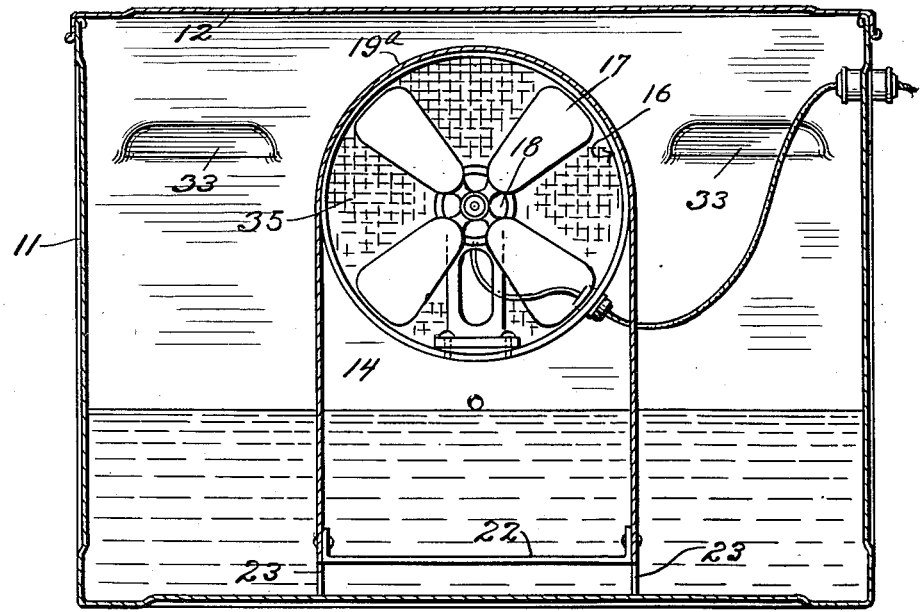
Fig. 2 is a transverse section of the apparatus taken on line 2—2 of Fig. 1.
Figure 3:
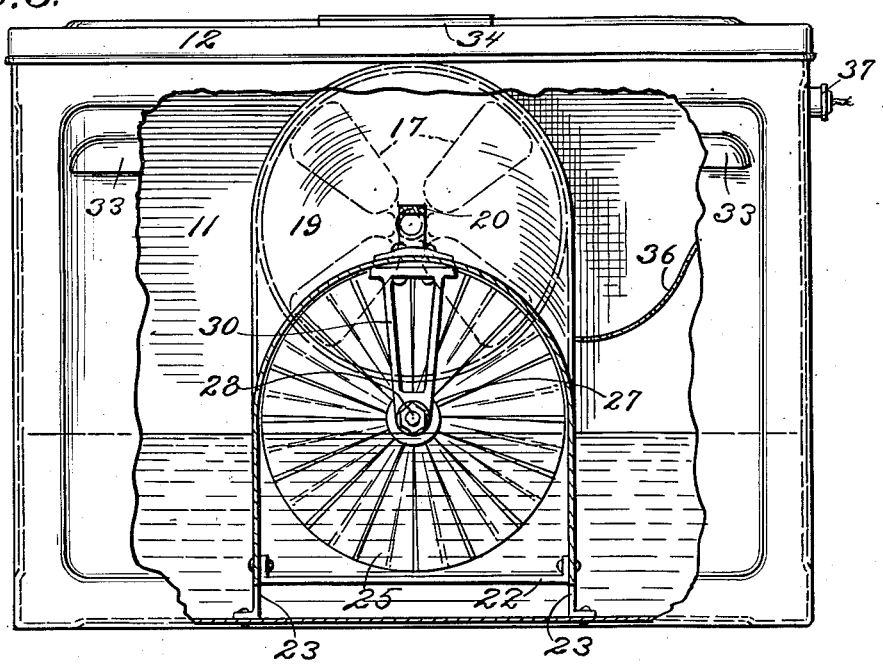
Fig. 3 is a section on line 3—3 of Fig. 1.

It is already known to provide a walled enclosure for gas treating purposes, with a liquid vessel in the lower part and a gas passage in the upper part of the enclosure, and a device or fan for maintaining gas flow into and through the passage above the liquid and thence to discharge; the novelty of the present invention residing partly in the means for bringing about intimate contact between the flowing gases and the treating liquid, in the general arrangement and combination, and in other features as will be described. The invention is herein shown as embodied in an apparatus designed for the treatment of air by water to condition the air for supply to the rooms of dwellings, offices and the like, it being understood that the same principles can be otherwise used, for example for conditioning air in closed automobiles or other vehicles during travel thereof.

The drawings indicate a generally oblong enclosure or box 11 having a removable cover 12. The enclosure 11 embodies a liquid vessel 13 in its lower part, water being shown occupying the vessel substantially to its maximum level, to which it should be periodically restored by refilling, under observation or any usual water level control.

Above a portion of the liquid within the enclosure is a gas passage, flue or space 14 through which air or gas flows in the direction of the arrows to be discharged preferably upwardly at an outlet 15. At its end opposite to the outlet the enclosure and gas passage have a gas inlet 16 in the form of an inward flange in which may be accommodated a fan 17 for maintaining gas flow, the fan shown as an ordinary ventilating type fan driven by an electric motor 18.

The general enclosure, tank or box 11 is portable, and shown provided with handles 33. It may be placed on a table or stand with the air intake near a partially opened window so as to receive and treat fresh outdoor air. If dehumidification is desired the vessel water may be cooled; for example, the table may be equipped with a cooled top on which the tank will rest, and suitable cooling mechanism may be placed under the top of said table, or the liquid may be cooled, by other means, for instance cold water from the building supply may be allowed to run into and drain out of the apparatus continuously or periodically; for which purpose the overflow 24 may have a connection to a waste pipe.

The above mentioned gas passage 14 is formed and enclosed by an interior domed wall or casing 19 which stands partly immersed in the vessel water, and extends above the water and is bodily removable with the devices carried by it.

In order that the water volume may extend clear to the ends of the vessel 13, the air inlet 16 and fan 17 are placed wholly above the water at the inlet end, and the removable casing 19 has a high end 19ᵃ shaped to fit the upper circumference of the inlet flange 16. The casing extends to the full length and to the bottom of enclosure 11. Beyond its high part 19ᵃ the casing slants down or converges at 19ᵇ, giving a tapering air passage, increasing velocity, and then the casing assumes again a horizontal disposition at 19ᶜ, above which is a handle 20 for lifting the casing out of the enclosure.

The casing or passage forming wall 19 is provided also with a cut out or gas outlet opening 21 delivering upwardly toward the final discharge 15. The lower opposite sides of wall 19 are connected and braced by strips or braces 22, beneath which are holes 23 for connecting the water spaces inside and outside of the casing for maintaining uniform liquid level. The apparatus may be filled through the outlet 15 and is provided with an overflow 24, which may discharge where desired.

Figures 4, 5:
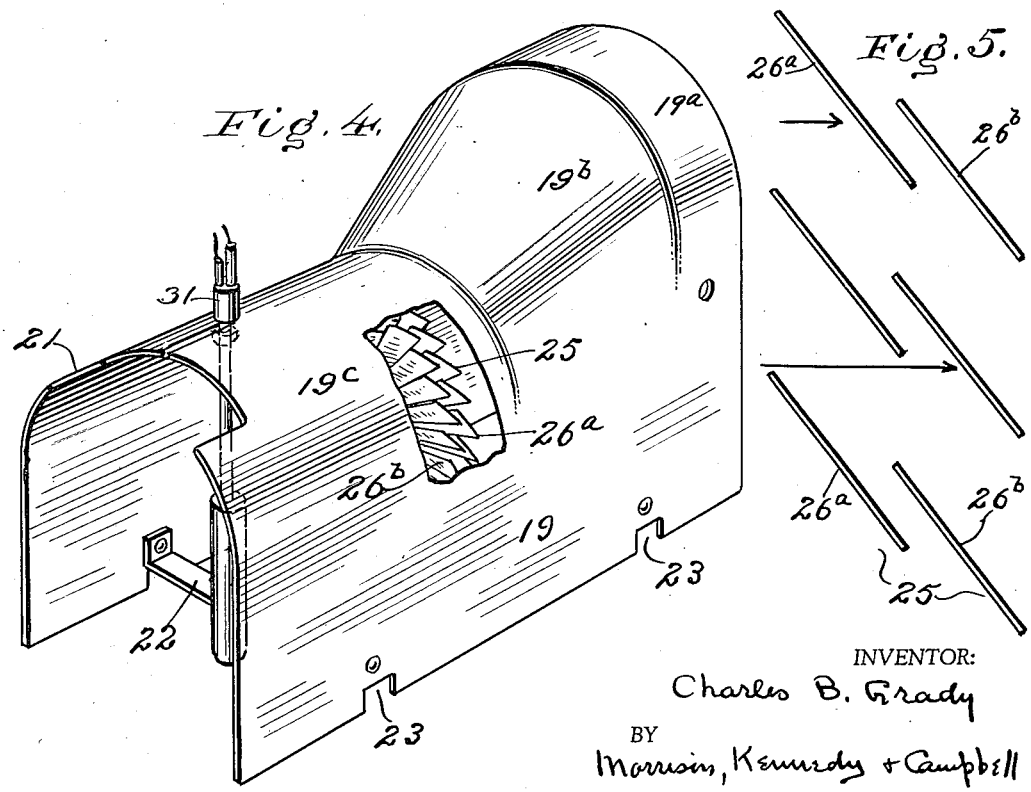
Fig. 4 is a perspective of the removable inner casing detached.
Fig. 5 is a diagram or development of the wheel blade arrangement.

It is a feature of this invention to provide in the gas passage 14 a partially immersed conditioning wheel 25 which is adapted to rotate in a preferably vertical plane transverse to the direction of the gas or air flow through it, the exposed part of the wheel substantially wholly filling and occupying the sectional area of the gas passage at this point. The preferred form of rotary wheel member 25 is shown as composed of a series of vanes in overlapping relation so that while the advancing air can pass through it the wheel constantly presents a wet surface at every part of the passage. For example there may be a plurality of fan shaped members 26ᵃ and 26ᵇ with their blades or vanes close together and overlapping in an arrangement to present always a blank surface normal to the air or gas flow, thus affording maximum impact and contact of all parts of the fast flowing gas upon the wet surfaces of the slow turning wheel and improving the humidifying or other treatment and the extraction of solids and dust from the gases. The complete wheel device 25 has a hub 27 turning loosely on an axle 28 which is provided with collars 29 to position the wheel. The axle 28 is mounted on a bracket 30 attached to removable casing 19. The axle 28 is arranged to extend in the same longitudinal direction as the gas flow through the gas passage 14 the wheel thereby rotating in a transverse plane and normal to the gas flow. The overlapping arrangement of the wheel members or blades is well shown by the development in Fig. 5 wherein the arrows show the air flow direction.

While the wheel 25 may be rotated or driven positively by any suitable connections, with variable drive speed, under suitable regulation, it is herein shown as being caused to rotate by reason of the flow of gas through it, the wheel for this purpose having its members 26 of fan construction, reacting with the air flow to rotate slowly but steadily the wheel and the wheel members as they pass below the surface of the water tend to cause an advantageous circulation of the water in various directions.

The action of the conditioning wheel 25 is that as it rotates each portion of its fan shaped members enters the liquid, thus discharging any accumulated solids and becoming wet, and then rises above the liquid into the air passage, carrying with it films of water, and its wet surfaces as they rise come into a position occupying the gas passage, so that the gas or air has to force its way through the system of wetted fan shaped vanes and thus effect intimate contact with the carried or suspended water or other liquid. The forced circulation of air thus causes the washing of the air, and the other treatments mentioned, the rotation of the wheel constantly refreshing and wetting the surface with which the gas or air contacts for its treatment; at the same time any dust or solids carried in the air are caught and deposited on the wheel, and thereupon are promptly brought down below the surface of the liquid and removed by the circulation of the liquid, such impurities gradually accumulating as sludge in the lower part of the vessel, to be removed progressively as by an underneath tap or at intervals by washing out of the entire apparatus.

A heating element 31, preferably electric, is provided, of the immersion type, depending from casing 19 so that this heater may be operated and the water heated if and when rapid humidification is desired. Its stem may be inserted in a slot in the casing, and the element there clamped by a nut 32.

The advantage of having an inner casing 19 which is removable is that this feature allows for ready removal and easy cleaning of tank, wheel and heating element. When necessary the casing may easily be lifted out by its handle 20, thus removing the air passage wall, from end to end, the bracket 30 and conditioning wheel carried within the casing, and the heating unit. This makes all parts of these elements accessible for cleaning, and the vessel 13 may be drained or dumped and washed.

The enclosure and casing comprise a new and novel combination in that the enclosure provides a large liquid storage, obviating frequent refilling and the casing allows for a compact arrangement of the air conditioning apparatus. The liquid extends the full length and width of the enclosure which may be 20 x 24 inches. The air driving fan is elevated and wholly above the water at the inlet end. It is surrounded by a flange which receives the end of the wall or casing 19 thus preserving the closure, and the wall thence slopes down to the proper level to enclose the conditioning wheel, presenting a converging air passage with proportionate acceleration of flow, impact upon the wheel and force to drive the wheel.

For protection a coarse screen 34 may be placed at the air outlet 15 and a screen 35 at the inlet 16, and both of these screens may be hinged and openable.

The head of the heating unit 31 may be connected by lead wire 38 to a socket 39 in a side wall, and similarly the motor 18 by a wire 36 to a socket 37, the sockets adapted exteriorly to receive ordinary electric plugs for coupling up the motor and heater respectively, and with any suitable controlling switches.

When starting humidification of a room the heater 31 may be operated, for example to warm the water to 90° F., which will greatly expedite the action. As soon as a comfortable degree of humidity is attained the heater should be disconnected, but the fan kept in operation to maintain the desired condition.

When the removable interior and domed casing 19 is not used and the enclosure itself forms the gas passage, the wheel 25 and its bracket or carriage 30 may be otherwise mounted to depend through a hole in the cover or top of the enclosure in a removable manner. If a gas propelling fan is desired which is larger than shown the enclosure may be suitably extended to accommodate it. The wheel 25 while shown as composed of two vaned structures in offset relation might be constructed with a single series of vanes of such great width as to overlap and avoid presenting any longitudinally clear or open gas passages.

Another modification is that the relation of the air propelling fan to the enclosure and inlet may be varied, and the fan need not be set directly in the inlet as shown. For example the fan may with some advantages be set outwardly of the inlet and spaced somewhat away and clear from the end wall of the enclosure but directed toward the inlet. In that case the fan may be a separate unit standing on its own base, in alinement with the enclosure; permitting the use of an ordinary ventilating fan, so that the remainder of the air treating apparatus hereof may be made and sold without the fan unit, but for use with any suitable fan. A very effective air driving action is obtainable by the described fan arrangement, and to cooperate the inlet walls may be reshaped somewhat or flared outwardly to facilitate air inflow and induced flow.

With this invention the humidity in a room can readily be raised within a short period of time from an uncomfortable to a comfortable degree of humidity; for example in a living room the humidity may easily be raised from 33% to 50% within less than two hours time, with the aid of the heating unit, and when attained this degree of humidity will remain for a considerable period without further heating operation.

There has thus been described a gas treating apparatus embodying the principles of the present invention; and since many matters of combination, arrangement and construction may be variously modified without departing from the principles, it is not intended to limit the invention to such matters except to the extent set forth in the appended claims.

What is claimed is:

1. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by a partly immersed wheel within the enclosure mounted to be rotated with its exposed part occupying the gas passage, and constructed of members through which gas may flow in contact with the exposed and wetted members of the wheel; said gas inlet being above the liquid at the inlet end of the enclosure; said enclosure having a flange surrounding the gas inlet, and an interior walled casing enclosing said wheel and forming a gas passage above the liquid, said casing being readily liftable from the enclosure, and having a part adapted to couple with said inlet flange when in place.

2. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by a partly immersed wheel within the enclosure mounted to be rotated with its exposed part occupying the gas passage, and constructed of members through which gas may flow in contact with the exposed and wetted members of the wheel; said gas inlet being above the liquid at the inlet end of the enclosure; said enclosure having a flange surrounding the gas inlet, and an interior walled casing enclosing said wheel and forming a gas passage above the liquid, said casing being readily liftable from the enclosure, and having a part adapted to couple with said inlet flange when in place; said gas flow maintaining means comprising a fan mounted in the gas inlet above the liquid, and said casing wall being inclined downwardly from said inlet forming a converging gas passage from the inlet to the wheel.

3. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by the combination with said elements of an interior walled casing forming a gas passage above the liquid within the enclosure, a partly immersed wheel within the casing mounted to be rotated with its exposed part occupying the gas passage, and constructed of members through which gas may flow in contact with the exposed and wetted members of the wheel; said casing being readily liftable from the enclosure and a heating unit dependingly mounted on said removable casing for immersion in the liquid.

4. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by the combination with said elements of an interior walled casing forming a gas passage above the liquid within the enclosure, a partly immersed wheel within the casing mounted to be rotated with its exposed part occupying the gas passage, and constructed of members through which gas may flow in contact with the exposed and wetted members of the wheel; and a liquid heating unit immersed in the liquid inside of said casing.

5. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by the combination with said elements of a readily removable interior walled casing forming a gas passage above the liquid within the enclosure, the enclosure walls being of such height as entirely to enclose the casing, a partly immersed wheel within the casing mounted to be rotated with its exposed part occupying the gas passage, and constructed of members through which gas may flow in contact with the exposed and wetted members of the wheel; the casing being of open bottom construction and resting loosely upon the bottom of the enclosure.

6. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by the combination with said elements of an interior walled casing forming a gas passage above the liquid within the enclosure, a partly immersed wheel within the casing mounted to be rotated in a plane transverse to the gas flow with its exposed part occupying the gas passage, and constructed of members through which gas may flow in contact with the exposed and wetted members of the wheel; said gas passage and inlet and outlet being of sectional area at least as large as that of the non-immersed part of the wheel, whereby such non-immersed part is wholly exposed to the gas flow.

7. An apparatus as in claim 6 and wherein the casing and enclosure are of longitudinal length in the direction of gas flow several times the longitudinal dimension of the wheel.

8. An apparatus as in claim 6 and wherein the casing and enclosure are of longitudinal length in the direction of gas flow several times the longitudinal dimension of the wheel, and the enclosure is transversely more than twice the dimension of the casing.

9. Apparatus for treating air or other gases by water or other liquids of the kind comprising an enclosure having walls forming a liquid vessel in its lower part and having gas inlet and outlet for gas flow above the liquid and means for maintaining gas flow through the enclosure from inlet to outlet; such apparatus characterized by the combination with said elements of an interior walled casing forming a gas passage above the liquid within the enclosure, a partly immersed wheel within the casing mounted to be rotated with its exposed part occupying the gas passage, and constructed of members through which gas may flow in contact with the exposed and wetted members of the wheel; said wheel turning in bearings mounted on the casing, and the casing being readily bodily liftable along with said bearings and wheel to remove it from the enclosure.

10. Portable apparatus for recirculating and treating air in a dwelling room comprising a flat bottomed enclosure having walls forming a water vessel in its lower part and having gas inlet from the room and outlet to the room for air flow above the water and a fan for maintaining air flow through the enclosure from inlet to outlet; such apparatus characterized by the combination with said elements of an interior walled casing forming an air passage above the water within the enclosure, said casing readily liftable from and replaceable in said enclosure, and a partially immersed wheel within the casing mounted to be rotated with its exposed part occupying the air passage, and constructed of members through which air may flow in contact with the exposed and wetted members of the wheel; said casing being of such large transverse dimension from inlet to outlet that the entire exposed part of the wheel is subject to the air flow.

11. Apparatus for treating air or other gases by water or other liquids of the kind comprising an enclosure having exterior walls forming a liquid vessel of substantial capacity in its lower part and having gas inlet and outlet for gas flow above the liquid and means for maintaining gas flow through the enclosure from inlet to outlet; such apparatus characterized by a partly immersed wheel within the enclosure mounted to be rotated with its exposed part occupying the gas flow path, and constructed of members through which gas may flow in contact with the exposed and wetted members of the wheel; and an interior walled casing of narrower width than the exterior enclosure and forming with the liquid in the vessel a passage through which the gas flows and which encloses the exposed part of said wheel.

12. Apparatus as in claim 11 and wherein the interior walled casing is readily liftable from the exterior enclosure.

13. Apparatus as in claim 11 and wherein the interior casing wall is of contour converging from the flow maintaining means to the wheel.

CHARLES B. GRADY.